United States Patent
Wang et al.

(10) Patent No.: US 10,436,912 B1
(45) Date of Patent: Oct. 8, 2019

(54) METHOD FOR ARAIM FAULT DETECTION BASED ON EXTRACTION OF CHARACTERISTIC VALUE OF PSEUDO-RANGE MEASUREMENT

(71) Applicant: Beihang University, Beijing (CN)

(72) Inventors: Zhipeng Wang, Beijing (CN); Yanbo Zhu, Beijing (CN); Zhen Gao, Beijing (CN); Jisi Fang, Beijing (CN); Jingtian Du, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/430,944

(22) Filed: Jun. 4, 2019

(30) Foreign Application Priority Data

May 15, 2019 (CN) .......................... 2019 1 0403788

(51) Int. Cl.
*G01S 19/20* (2010.01)
*G06F 17/16* (2006.01)
*G06F 17/18* (2006.01)
*G01S 19/24* (2010.01)

(52) U.S. Cl.
CPC .............. *G01S 19/20* (2013.01); *G01S 19/24* (2013.01); *G06F 17/16* (2013.01); *G06F 17/18* (2013.01)

(58) Field of Classification Search
CPC .......... G06F 17/16; G06F 17/18; G01S 19/09; G01S 19/20; G01S 19/24; G01S 19/46
USPC ...................................................... 342/357.29
See application file for complete search history.

(56) References Cited

U.S. PATENT DOCUMENTS

| 9,146,322 | B2* | 9/2015 | Coatantiec | ............. G01S 19/20 |
| 10,197,678 | B1* | 2/2019 | Wang | ...................... G01S 19/20 |
| 2005/0114023 | A1* | 5/2005 | Williamson | ......... G01C 21/165 |
| | | | | 701/472 |

* cited by examiner

*Primary Examiner* — Dao L Phan
(74) *Attorney, Agent, or Firm* — Locke Lord LLP; Tim Tingkang Xia, Esq.

(57) ABSTRACT

The present disclosure provides a method for ARAIM fault detection based on extraction of characteristic value of pseudo-range measurement, comprising: calculating a sum of integrity risks of each of fault modes and a maximum value of the integrity risks of each of the fault modes, calculating a quantity of the fault modes by using a ratio of the sum of integrity risks of each of fault modes to an integrity risk of a largest fault, and using a sample quantity of corresponding pseudo-range measurement values as an effective sample quantity; using a ratio of a time duration T to the effective sample quantity as an effective sampling duration; sampling samples of pseudo-range measurement values that are gathered by a receiver within the effective sampling duration, to obtain an effective pseudo-range measurement set; and by using the effective pseudo-range measurement set, calculating a test statistic, and performing integrity fault detection.

5 Claims, 4 Drawing Sheets

METHOD FOR ARAIM FAULT DETECTION BASED ON EXTRACTION OF CHARACTERISTIC VALUE OF PSEUDO-RANGE MEASUREMENT

CROSS-REFERENCE TO RELATED PATENT APPLICATION

This non-provisional application claims priority to and the benefit of, pursuant to 35 U.S.C. § 119(a), patent application Serial No. CN201910403788.3 filed in China on May 15, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present disclosure relates to the technical field of satellite navigation, and particularly relates to a method for ARAIM fault detection based on extraction of characteristic value of pseudo-range measurement.

BACKGROUND

The BeiDou Navigation Satellite System (BDS) is a global satellite navigation system that was independently developed by China. It is the fourth mature satellite navigation system following the global positioning system (GPS) of the United States, the GLObalnaya NAvigatsionnaya Sputnikovaya Sistema (GLONASS) of Russia and the Galileo Satellite Navigation System of Europe.

The BeiDou Navigation Satellite System consists of a space segment, a ground segment and a user segment, wherein the space segment is designed to consist of 5 Geosynchronous Earth Orbit satellites and 30 non-Geosynchronous Earth Orbit satellites. The BDS can currently provide to various users locating, navigation and time services with a high precision and a high reliability in an all-weather and all-time manner in the Asia-Pacific area, and has the capacity of short-message communication. Currently the locating precision is 10 meters, the velocity measurement precision is 0.2 meters/second, and the time service precision is 10 nanoseconds.

The differences between BDS and GPS are:

1. The BDS possesses both of locating and communication functions. If the system starts the service, the receivers can directly communicate via the navigation satellites, without the supporting by other communication systems. However, GPS can only locate.

2. Because the BeiDou System currently merely covers China and the neighboring countries and regions, it does not have a communication dead zone in design.

3. The BeiDou System is of active locating, which requires the clients to send information to the satellites. Accordingly it provides selective services, and can at any time decide whether to provide the locating service to a certain client. However, the GPS system is of passive locating, and cannot restrict undesirable users from using it (unless the entire system is shut). Therefore, the BDS satellites can locate only after receiving client information and responding, and if the users are too many clog may happen, while the GPS system can provide locating information simultaneously to an infinite quantity of receivers.

Advanced Receiver Autonomous Integrity Monitoring (ARAIM), as a new generation of integrity monitoring technology of airborne receivers of satellite navigation, has the capacity of using multiple GNSS (Global Navigation Satellite System) constellations and bifrequency and multiple-fault monitoring, can support vertical navigation below the 200-feet height (LPV-200), has a low upgrading cost and obvious performance improvement, and is currently a research hotspot in the field of application in civil aviation of the GNSS. The benchmark algorithm of the ARAIM is using the data transmitted by the satellite navigation system as the input, performing navigational locating and integrity assessment by using the ephemeris broadcast by the satellites, and correspondingly outputting indicators that characterize the precision and the integrity of a target location such as protection class, precision and usability. For the ARAIM, as a technique of integrity monitoring, it is very important how to ensure its integrity indicator and output in real time its usability.

Fault detection refers to a navigation receiver detecting whether the received satellite navigation signal has an abnormal deviation. When the navigation receiver has received a redundant observed quantity besides the measurement values necessary for the locating, it judges whether the redundant observed quantity and all of the observed quantities used for the detection are consistent, thereby judging whether a fault exists. An ARAIM receiver performs autonomous fault detection by using such a principle, to ensure the aviation operation safety.

The purpose of the fault detection is to ensure that when a satellite cannot correctly emit a navigation signal a receiver can in time emit an alarm, thereby ensuring the safety and reliability of the navigation service. The basic idea of fault detection is performing consistency check to test statistics by using redundant information. Currently, according to the difference between the test statistics of the fault detection, all of the methods of ARAIM fault detection can be classified into two classes: method of location domain and method of pseudo-range domain. The substantial detection method of the ARAIM is the solution separation algorithm of the pseudo-range domain, which achieves fault detection by comparing the test statistics and a threshold. Assuming that a certain satellite has a fault, the subset locating solution including the fault satellite must separate from subset locating solutions including merely healthy satellites, so the fault is found.

However, in the solution separation algorithm, each time of hypothesis testing performs one time of locating resolving, and finally test statistics of the same quantity as the quantity of fault hypothesis will be generated. Because the fault detection is performed on the airborne receiver, the large amount of resolving definitely affects the real-time capability. As the quantity of the visible satellites received by receivers is increasing, the quantities of observed quantities and fault modes increase accordingly, and the problem of the massive calculation that the solution separation algorithm is facing is required to be solve urgently.

Integrity refers to the capacity of a navigation system of in time giving an alarm when the locating information provided by the navigation system cannot satisfy the requirements of operation due to a certain fault. The core indicators of integrity include alarming time, alarming threshold and integrity risk probability value. When a satellite navigation system cannot satisfy the requirements of navigation operation, that can be solved by the autonomous fault detection of the receiver. However, fault detection may have omission, which results in that there is no alarm when the locating error exceeds the alarming threshold, when an integrity risk emerges, which affects the integrity of the entire ARAIM service. The locating information when an integrity risk is happening is referred to as Hazardously Misleading Information (HMI), and the integrity risk is determined by using the probability of the occurrence of the Hazardously Misleading Information.

In the ARAIM, as a multi-constellation satellite navigation system, besides the commonly seen satellite faults such as single satellite or multiple satellites, constellation faults are also required to be considered. Constellation faults are faults that are caused by the space segment or the ground segment and have correlation. Such types of faults affect the navigation signals or texts of multiple satellites, which results in that all of the pseudo-range measurement values of the satellites in the navigation constellation maintain consistent, and do not have a redundant observed quantity, so the solution separation algorithm cannot be used for the consistency detection. Constellation faults cause receivers to obtain pseudo-range measurement values that are consistent, lack the comparison of redundant observed quantities, and not be able to perform fault detection by using the autonomous detection of the receivers.

Therefore, in order to solve, in the prior art, the problem of real-time capability of the solution separation algorithm, and the problem of the unavailability under constellation faults, the present disclosure provides a method for ARAIM fault detection based on extraction of characteristic value of pseudo-range measurement.

SUMMARY

An object of the present disclosure is to provide a method for ARAIM fault detection based on extraction of characteristic value of pseudo-range measurement, wherein the method comprises the following steps:

calculating a sum of integrity risks of each of fault modes and a maximum value of the integrity risks, calculating a quantity of the fault modes by using a ratio of a total integrity risk to an integrity risk of a largest fault, and using a sample quantity of corresponding pseudo-range measurement values as an effective sample quantity;

using a ratio of a time duration T to the effective sample quantity as an effective sampling duration;

sampling samples of pseudo-range measurement values that are gathered by a receiver within the effective sampling duration, to obtain an effective pseudo-range measurement set; and by using the effective pseudo-range measurement set, calculating a test statistic, and performing integrity fault detection.

Optionally, the sum of integrity risks of each of fault modes is calculated by using the following method:

$$P_\Sigma = \sum_{k=0}^{N} P\{|x_q^{(0)} - x_q| > PL \cap |x_k^{(k)} - x_q^{(0)}| < L\},$$

wherein L is a threshold, $x_q$ represents a true position of a user, $x_q^{(0)}$ represents a solution of all visible satellites, $x_k^{(k)}$ is a solution of subset locating in a fault mode k, PL is a protection class, and P is a probability of occurrence of a fault mode.

Optionally, the maximum value of the integrity risks is calculated by using the following method, $$P_{MAX} = \text{MAX}\{P[|x_q^{(0)} - x_q| > PL \cap |x_k^{(k)} - x_q^{(0)}| < L]\},$$

wherein L is a threshold, $x_q$ represents a true position of a user, $x_q^{(0)}$ represents a solution of all visible satellites, $x_k^{(k)}$ is a solution of subset locating in a fault mode k, PL is a protection class, and P is a probability of occurrence of a worst fault.

Optionally, the effective sample quantity is calculated by using the following method:

$$N^* = \frac{P_\Sigma}{P_{max}},$$

wherein $P_\Sigma$ is the sum of integrity risks of each of fault modes, and $P_{MAX}$ is the maximum value of the integrity risks.

Optionally, the effective sampling duration is calculated by using the following method:

$$\Delta T_e = \frac{T}{N^*},$$

wherein T is the time duration, and N* is the effective sample quantity.

Another object of the present disclosure is to provide a method for ARAIM fault detection based on extraction of characteristic value of pseudo-range measurement, wherein the method comprises the following steps:

acquiring N pseudo-range measurement values, and calculating covariances of any two of the pseudo-range measurement values, to obtain a pseudo-range-measurement-value covariance matrix;

performing singular value decomposition to the pseudo-range-measurement-value covariance matrix, and solving a first matrix and a second matrix that are obtained after the decomposition, to obtain a column vector of the first matrix and a column vector of the second matrix;

determining a dimensionality k, selecting and arranging from bigger to smaller k characteristic values of the second matrix, and constructing column vectors of the second matrix that are corresponding to k selected singular values into a data conversion matrix;

performing characteristic extraction to the acquired N pseudo-range measurement values by using the data conversion matrix; and by using the pseudo-range measurement values after being extracted characteristics, calculating a test statistic, and performing integrity fault detection.

Optionally, the covariances of the pseudo-range measurement values are calculated by using the following method:

$$\text{cov}(x_i, x_j) = E[(x_i - m_x)(x_j - m_x)],$$

wherein $x_i$, $x_j$ are the any two of the pseudo-range measurement values, and $m_x$ is a mean value of all of the pseudo-range measurement values; and forming the pseudo-range-measurement-value covariance matrix from the covariances of all of the pseudo-range measurement values that are obtained by calculating.

Optionally, the singular value decomposition is performed by using the following method:

$$\Sigma = U\Lambda V^H,$$

wherein $\Sigma$ is the pseudo-range-measurement-value covariance matrix, U is the first matrix whose column vector is a characteristic vector of $\Sigma\Sigma^H$, V is the second matrix whose column vector is a characteristic vector of $\Sigma^H\Sigma$, and $\Sigma^H$ is a conjugate matrix obtained by transposition of the pseudo-range-measurement-value covariance matrix $\Sigma$; and solving the first matrix U and the second matrix $\lambda_i'$, comprising:

setting $|\lambda I - \Sigma\Sigma^H| = 0$, obtaining a characteristic value $\lambda_i$, substituting the characteristic value $\lambda_i$ back to the matrix $(\lambda I - \Sigma\Sigma^H)$, and obtaining the column vector of the first matrix U; and setting $|\lambda I - \Sigma^H E| = 0$, obtaining a characteristic value $\lambda_i'$, substituting the characteristic value $\lambda_i'$ back to the matrix $(\lambda I - \Sigma^H \Sigma)$, and obtaining the column vector of the second matrix V.

Optionally, the dimensionality k is determined by using the following method:

$$\frac{\sum_{i=1}^{k} x_i}{\sum_{i=1}^{N} x_i} \geq 0.99,$$

wherein $x_i$ are the pseudo-range measurement values.

Optionally, the performing characteristic extraction by using the data conversion matrix is performed by using the following method:

extracting column vectors of a V matrix by using K singular values, to obtain the data conversion matrix $V^k$, $x' = x \cdot V^k$, wherein x' are the pseudo-range measurement values after being extracted characteristics, and x are acquired original pseudo-range measurement values.

The method for ARAIM fault detection based on extraction of characteristic value of pseudo-range measurement provided by the present disclosure, within a certain time duration, performs pseudo-range measurement value sampling according to particular sampling intervals, and by determining the effective sampling interval obtains the effective pseudo-range measurement values to perform locating resolving, thereby greatly reducing the data processing quantity of the airborne receiver, reducing the burthen of the airborne receiver, and improving the real-time capability of the algorithm.

The method for ARAIM fault detection based on extraction of characteristic value of pseudo-range measurement provided by the present disclosure, by constructing the data conversion matrix, performs characteristic extraction to the gathered pseudo-range measurement values, extracts and distinguishes the characteristics of the pseudo-range measurement values of the satellites within the same one constellation, and constructs N–K redundant observed quantities and K new pseudo-range measurement values, to enable the receiver to perform fault detection by using the consistency check of solution separation, and realize the usability of the pseudo-range measurement values during constellation faults.

The method for ARAIM fault detection based on extraction of characteristic value of pseudo-range measurement provided by the present disclosure performs time sampling to the pseudo-range measurement values preliminarily collected by the receiver, to obtain the effective sample data among them, which reduces the locating resolving, and improves the real-time capability of the fault detection of the airborne receiver. When facing constellation faults, the method extracts the main characteristic components of the pseudo-range measurement values, and simultaneously obtains the redundant values, to enable the autonomous fault detection of the receiver to be normally used during constellation faults, which ensures the usability of the algorithm of solution separation of fault detection.

It should be understood that, the preceding general description and the subsequent detailed description are exemplary description and interpretation, and should not be considered as limiting the contents that the present disclosure seeks to protect.

BRIEF DESCRIPTION OF DRAWINGS

By referring to the accompanying drawings, more objects, functions and advantages of the present disclosure will be clearly explained by using the following description of the embodiments of the present disclosure. In the drawings.

DETAILED DESCRIPTION

Figure 1:
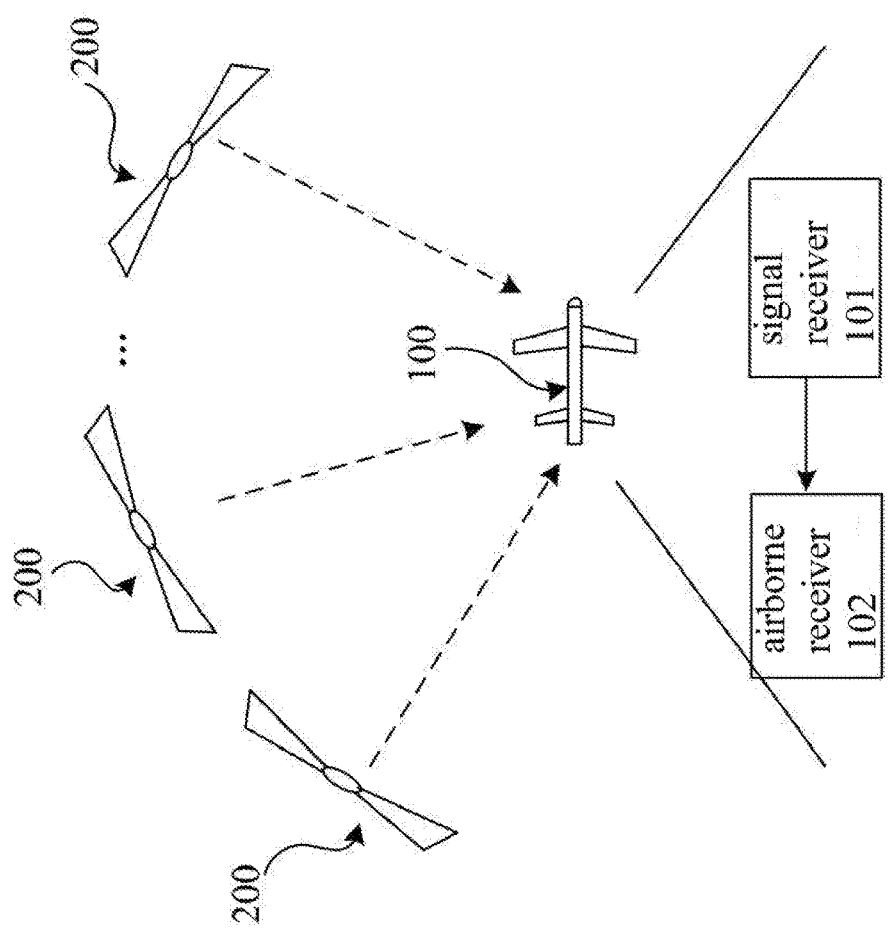
FIG. 1 schematically shows a schematic diagram of the satellite locating signal sending of the present disclosure.

By referring to the exemplary embodiments, the objects and functions of the present disclosure and the approaches used for realizing those objects and functions are clearly explained. However, the present disclosure is not limited to the exemplary embodiments disclosed below, and can be implemented in various forms. The essence of the description is merely to facilitate a person skilled in the art to comprehensively understand the particular details of the present disclosure.

The embodiments of the present disclosure will be described below by referring to the drawings. In the drawings, the same reference numbers denote the same or similar components or the same or similar steps.

The method for ARAIM fault detection based on extraction of characteristic value of pseudo-range measurement provided by the present disclosure will be described in detail below by using particular embodiments. FIG. 1 shows a schematic diagram of the satellite locating signal sending of the present disclosure. Satellites 200 send locating signals to an aircraft 100, and a signal receiver 101 on the aircraft 100 receives the locating signals, and processes to obtain pseudo-range measurement values. The airborne receiver 102 samples the pseudo-range measurement values, and performs the fault detection of integrity risk by using the gathered pseudo-range measurement values.

The First Embodiment

According to the present disclosure, this embodiment, aiming at the problem that the receiver receives a large quantity of pseudo-range measurement values within a certain time duration, and performs locating resolving to all of the pseudo-range measurement values, and the calculated amount during the locating resolving process is large, which ensures the accuracy but loses the real-time capability, proposes a method for ARAIM fault detection based on extraction of characteristic value of pseudo-range measurement.

Figure 2:
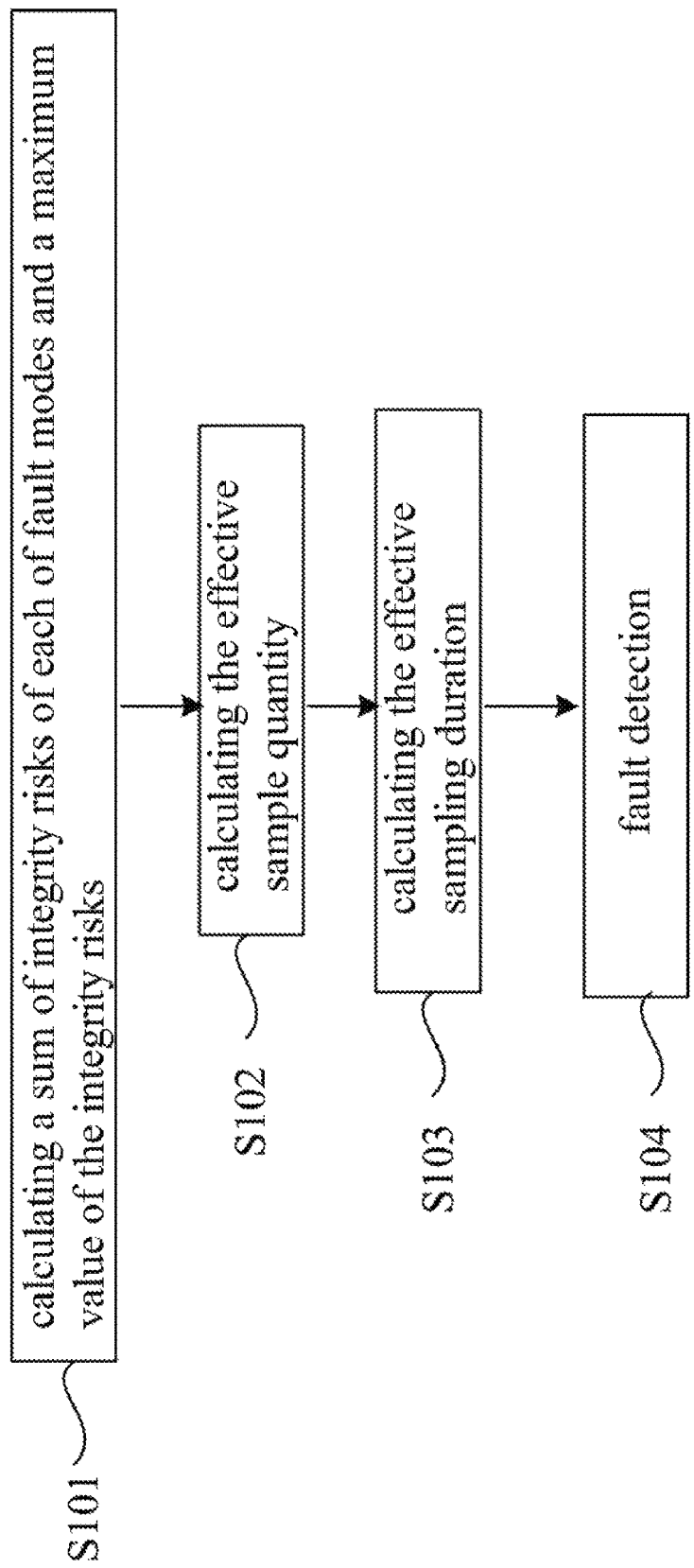
FIG. 2 shows a flow chart of the method for ARAIM fault detection based on extraction of characteristic value of pseudo-range measurement of the first embodiment of the present disclosure.

FIG. 2 shows a flow chart of the method for ARAIM fault detection based on extraction of characteristic value of pseudo-range measurement of the first embodiment of the present disclosure. According to an embodiment of the present disclosure, a method for ARAIM fault detection based on extraction of characteristic value of pseudo-range measurement comprises the following steps.

Step S101, calculating a sum of integrity risks of each of fault modes and a maximum value of the integrity risks, that is, the integrity risk value corresponding to the worst fault mode.

A sum of integrity risks of each of fault modes and a maximum value of the integrity risks are calculated, wherein the sum of integrity risks of each of fault modes is calculated by using the following method:

$$P_\Sigma = \sum_{k=0}^{N} P\{|x_q^{(0)} - x_q| > PL \cap |x_k^{(k)} - x_q^{(0)}| < L\},$$

wherein L is a threshold, $x_q$ represents a true position of a user, $x_q^{(0)}$ represents a solution of all visible satellites, $x_k^{(k)}$ is a solution of subset locating in a fault mode k, PL is a protection class, and P is the fault mode of a certain satellite.

It should be understood that, the fault modes refer to the probabilities of faults with respect to each of the satellites; for example, the probability that a first satellite has a fault is a first fault mode, and the probability that a second satellite has a fault is a second fault mode. Satellite faults include single satellite and multiple satellites.

In the above process of calculating the sum of integrity risks of each of fault modes, the condition that the locating error is greater than the protection class and the test statistic is less than a preset threshold is satisfied, and the total integrity risk value within a certain time duration is determined by solving the sum.

The maximum value of the risk values of each of the fault modes is the risk value in the worst situation, and the maximum value of the integrity risks is calculated by using the following method:

$$P_{MAX} = MAX\{P\{|x_q^{(0)} - x_q| > PL \cap |x_k^{(k)} - x_q^{(0)}| < L\}\},$$

wherein L is a threshold, $x_q$ represents a true position of a user, $x_q^{(0)}$ represents a solution of all visible satellites, $x_k^{(k)}$ is a solution of subset locating in a fault mode k, PL is a protection class, and P is the fault mode of a certain satellite.

Step S102, calculating the effective sample quantity.

A quantity of the fault modes is calculated by using a ratio of the sum of integrity risks of each of fault modes to an integrity risk of a largest fault, and a sample quantity of a corresponding pseudo-range measurement value is used as an effective sample quantity.

According to an embodiment of the present disclosure, when the risk value in the worst fault situation, that is, the maximum value of the integrity risk values, is selected, the most effective sample quantity will be obtained, which is defined as the effective sample quantity.

The effective sample quantity is calculated by using the following method:

$$N^* = \frac{P_\Sigma}{P_{max}},$$

wherein $P_\Sigma$ is the sum of integrity risks of each of fault modes, and $P_{MAX}$ is the maximum value of the integrity risks.

Step S103, calculating the effective sampling duration.

A ratio of a time duration T to the effective sample quantity is used as an effective sampling duration.

The ultimate purpose of the relevant sampling is to obtain effective samples of test statistics that do not have a temporal correlation, and only when the effective sampling interval has been determined, the original samples can be sampled.

Figure 3:
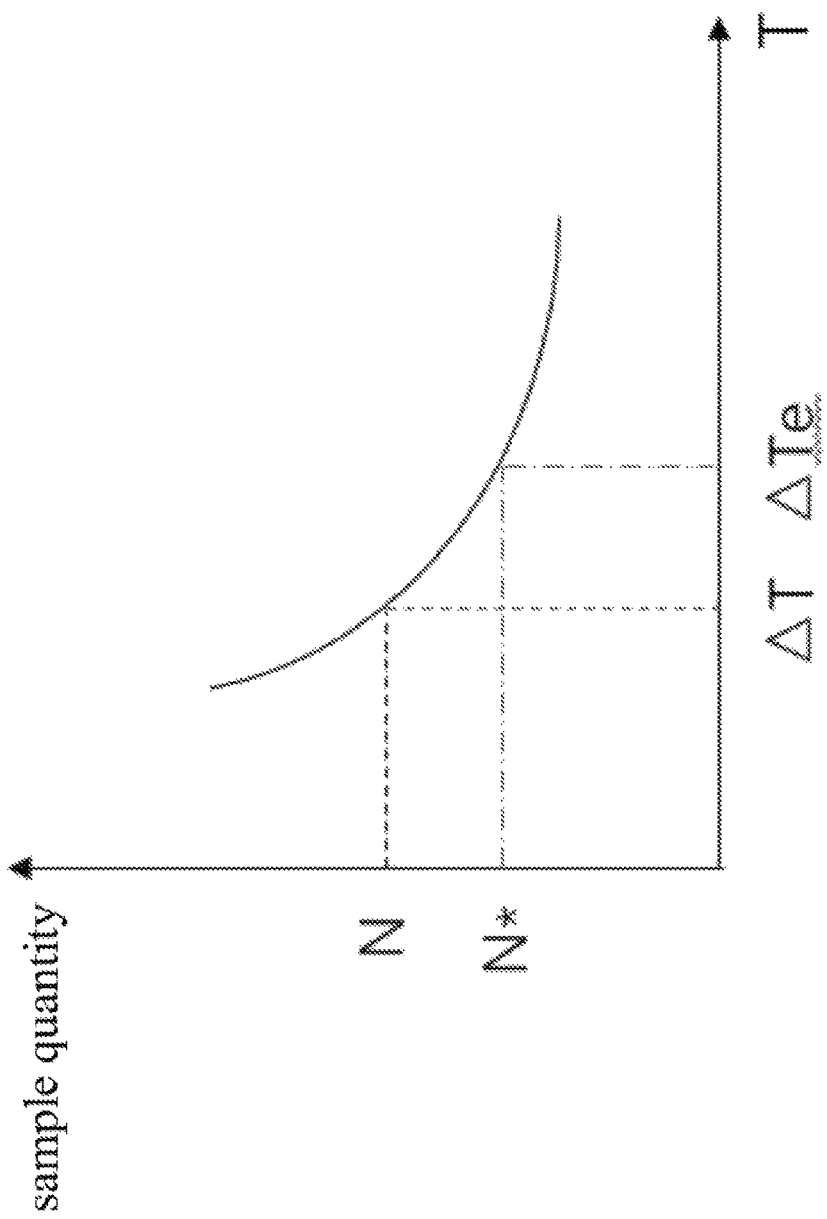
FIG. 3 shows a graph of relation between the sampling duration and the sample quantity of the present disclosure.

According to an embodiment of the present disclosure, within a time duration T, the airborne receiver samples with the time interval of $\Delta T$, and obtains the sample quantity of N discrete pseudo-range measurement values, and no matter how the sample quantity and the sampling duration change, the product of them always equals to the length T of the certain given time duration. FIG. 3 shows a graph of relation between the sampling duration and the sample quantity of the present disclosure. Accordingly, in the present disclosure the effective sampling duration is calculated by using the following method:

$$\Delta T_e = \frac{T}{N^*},$$

wherein T is the time duration, and N* is the effective sample quantity.

With the effective sampling duration, the samples of the pseudo-range measurement values gathered by the airborne receiver are sampled, to obtain an effective pseudo-range measurement set $\{x_e\}$.

Step S104, fault detection.

By using the effective pseudo-range measurement set $\{x_e\}$, a test statistic is calculated: $x_e - x^{(0)}$, wherein $x_e$ is the effective pseudo-range measurement value, and $x^{(0)}$ is the solution of all visible satellites.

The test statistic is compared with a threshold, if the test statistic is greater than the threshold, a fault happens, and if the test statistic is less than/equal to the threshold, no fault happens.

The present disclosure, by sampling the pseudo-range measurement values within the effective duration, obtains the effective pseudo-range measurement values by determining the effective sampling interval to perform locating resolving. Because the product of the original sampling interval and the sample quantity of the receiver and the product of the effective sampling interval and the effective sample quantity are equal, which is the length of the given time duration, the effective sampling interval can in turn be calculated out, and the effective pseudo-range measurement value used for the locating calculating can be determined, thereby greatly reducing the data processing quantity of the airborne receiver, reducing the burthen of the airborne receiver, and improving the real-time capability of the algorithm.

The Second Embodiment

Figure 4:
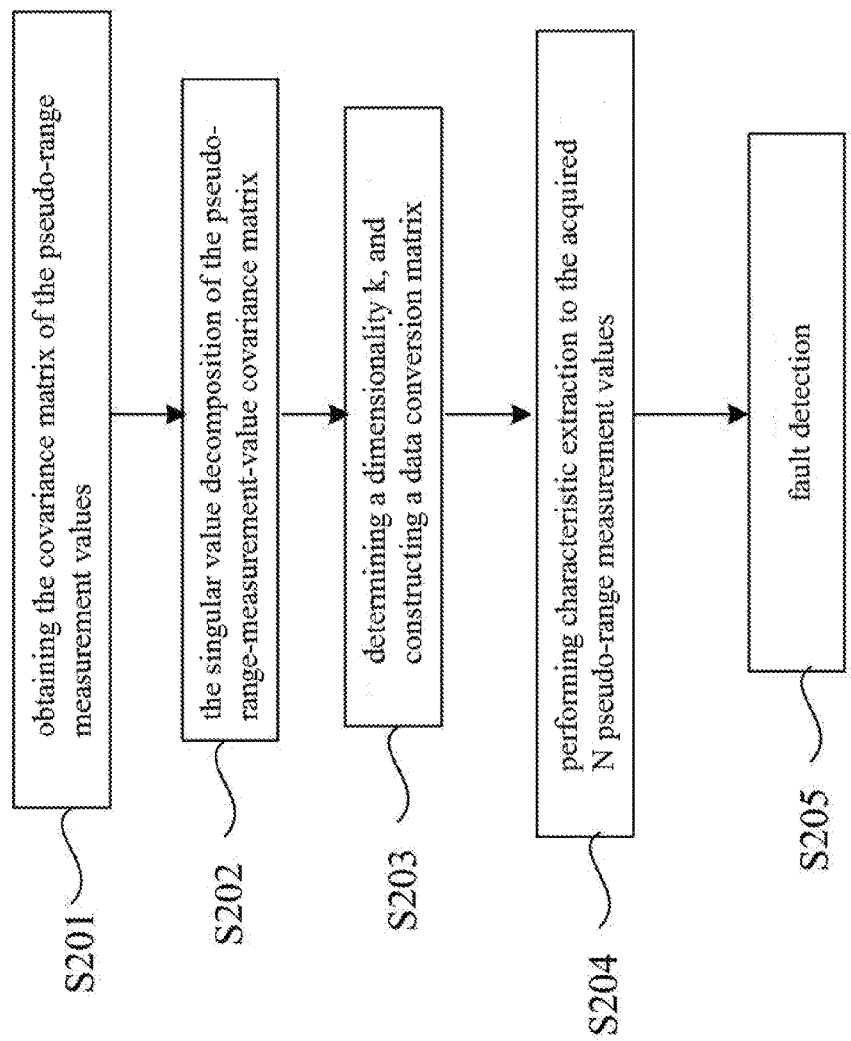
FIG. 4 shows a flow chart of the method for ARAIM fault detection based on extraction of characteristic value of pseudo-range measurement of the second embodiment of the present disclosure.

This embodiment is for the problem that the consistency in the pseudo-range measurement values in constellation faults results in that redundant observed quantities do not exist, which results in that ARAIM fault detection is unavailable. FIG. 4 shows a flow chart of the method for ARAIM fault detection based on extraction of characteristic value of pseudo-range measurement of the second embodiment of the present disclosure. According to an embodiment of the present disclosure, a method for ARAIM fault detection based on extraction of characteristic value of pseudo-range measurement comprises the following steps.

Step S201, obtaining the covariance matrix of the pseudo-range measurement values.

N pseudo-range measurement values are acquired, and covariances of any two of the pseudo-range measurement values are calculated, to obtain a pseudo-range-measurement-value covariance matrix.

The airborne receiver gathers N pseudo-range measurement values, and the covariances of the pseudo-range measurement values are calculated by using the following method:

$$\mathrm{cov}(x_i, x_j) = E[(x_i - m_x)(x_j - m_x)],$$

wherein $x_i$, $x_j$ are the any two of the pseudo-range measurement values, and $m_x$ is a mean value of all of the pseudo-range measurement values.

The mean value $m_x$ of all of the pseudo-range measurement values is expressed as:

$$m_x = \frac{\sum x_i}{N}.$$

The pseudo-range-measurement-value covariance matrix is formed from the covariances of all of the pseudo-range measurement values that are obtained by calculating, wherein the pseudo-range-measurement-value covariance matrix formed in this embodiment is expressed by using the $\Sigma$ as:

$$\Sigma = \begin{pmatrix} C_{11} & C_{12} & \ldots & C_{1n} \\ C_{21} & C_{22} & \ldots & C_{2n} \\ \vdots & \vdots & \vdots & \vdots \\ C_{n1} & C_{n2} & \ldots & C_{nn} \end{pmatrix},$$

wherein $C_{11}$, $C_{12}$, $C_{13}$, ... $C_{nn}$ are individually the covariances obtained by calculating the corresponding two pseudo-range measurement values.

Step S202, the singular value decomposition of the pseudo-range-measurement-value covariance matrix.

Singular value decomposition is performed to the pseudo-range-measurement-value covariance matrix obtained in Step S201, and a first matrix and a second matrix that are obtained after the decomposition are solved, to obtain a column vector of the first matrix and a column vector of the second matrix.

According to an embodiment of the present disclosure, the singular value decomposition is performed by using the following method:

$$\Sigma = U\Lambda V^H,$$

wherein $\Sigma$ is the pseudo-range-measurement-value covariance matrix, U is the first matrix whose column vector is a characteristic vector of $\Sigma\Sigma^H$, V is the second matrix whose column vector is a characteristic vector of $\Sigma^H\Sigma$, $\Sigma^H$ is a conjugate matrix obtained by transposition of the pseudo-range-measurement-value covariance matrix $\Sigma$, and $\Lambda$ is a diagonal matrix formed by the characteristic values of the covariance matrix $\Sigma$.

After performing singular value decomposition to the pseudo-range-measurement-value covariance matrix, the matrixes that are obtained after the decomposition are solved; that is, the first matrix U, the second matrix V and the diagonal matrix $\Lambda$ are solved.

Regarding the solving of the diagonal matrix:

setting $|\lambda I - \Sigma^H\Sigma| = 0$, obtaining a characteristic value $\lambda_i$, then the diagonal matrix $\Lambda = \mathrm{diag}\{\sqrt{\lambda_1}, \sqrt{\lambda_2}, \ldots \sqrt{\lambda_r}\}$, wherein $\sqrt{\lambda_i}$ is the singular value of the pseudo-range-measurement-value covariance matrix $\Sigma$; and solving the first matrix U and the second matrix V, comprising:

setting $|\lambda I - \Sigma\Sigma^H| = 0$, obtaining a characteristic value $\lambda_i$, substituting the characteristic value $\lambda_i$ back to the matrix $(\lambda I - \Sigma\Sigma^H)$, wherein the obtained characteristic vector is the column vector of the first matrix U; and setting $|\lambda I - \Sigma^H\Sigma| = 0$, obtaining a characteristic value $\lambda_i'$, substituting the characteristic value $\lambda_i'$ back to the matrix $(\lambda'I - \Sigma\Sigma^H)$, wherein the obtained characteristic vector is the column vector of the second matrix V.

Step S203, determining a dimensionality k, and constructing a data conversion matrix.

determining a dimensionality k, selecting and arranging from bigger to smaller k characteristic values of the second matrix, and constructing column vectors of the second matrix that are corresponding to k selected characteristic values into a data conversion matrix.

According to an embodiment of the present disclosure, the dimensionality k is determined by using the following method:

$$\frac{\sum_{i=1}^{k} x_i}{\sum_{i=1}^{N} x_i} \geq 0.99,$$

wherein $x_i$ are the pseudo-range measurement values. The above method reserves 99% of the information of the original data.

K characteristic values of the second matrix are selected and arranged from bigger to smaller. For example, k characteristic values $\lambda_1'$, $\lambda_2'$, ..., $\lambda_k'$ of the second matrix are selected, and the k selected singular values are arranged from bigger to smaller. Column vectors of the second matrix that are corresponding to k selected characteristic values are constructed into a data conversion matrix. For example, the column vectors that are corresponding to the characteristic values $\lambda_1'$, $\lambda_2'$, ... $\lambda_k'$ are $V_1$, $V_2$, ... $V_k$ respectively, and the k column vectors are constructed into a data conversion matrix $V^k$: $V^k = (V_1 \; V_2 \ldots V_k)$.

Step S204, performing characteristic extraction to the acquired N pseudo-range measurement values.

Characteristic extraction is performed to the acquired N pseudo-range measurement values by using the data conversion matrix. According to an embodiment of the present disclosure, the performing characteristic extraction by using the data conversion matrix is performed by using the following method:

$$x' = x \cdot V^k,$$

wherein x' are the pseudo-range measurement values after being extracted characteristics, x are acquired original pseudo-range measurement values, and $V^k$ is the data conversion matrix.

Step S205, fault detection.

By using the pseudo-range measurement values after being extracted characteristics x', a test statistic x'–x$^{(0)}$ is calculated, wherein x' are the pseudo-range measurement values after being extracted characteristics, and x$^{(0)}$ is the solution of all visible satellites.

The test statistic is compared with a threshold, if the test statistic is greater than the threshold, a fault happens, and if the test statistic is less than/equal to the threshold, no fault happens.

The above embodiment extracts and distinguishes the characteristics of the pseudo-range measurement values of the satellites within the same one constellation, and constructs N–K redundant observed quantities and K new pseudo-range measurement values, to enable the receiver to perform fault detection by using the consistency check of solution separation.

The embodiment, by calculating the covariance matrix of the pseudo-range measurement values, obtains its characteristic values and characteristic vectors, selects the matrix formed by the characteristic vectors corresponding to the k characteristics of the largest characteristic values, converts the pseudo-range measurement value matrix into a new space, and constructs the redundant measurement values, to realize the dimensionality reduction of the data characteristics, reduce their consistency, and facilitate the comparison and distinguishing of the fault detection algorithm.

The method for ARAIM fault detection based on extraction of characteristic value of pseudo-range measurement provided by the present disclosure, within a certain time duration, performs pseudo-range measurement value sampling according to particular sampling intervals, and by determining the effective sampling interval obtains the effective pseudo-range measurement values to perform locating resolving, thereby greatly reducing the data processing quantity of the airborne receiver, reducing the burthen of the airborne receiver, and improving the real-time capability of the algorithm.

The method for ARAIM fault detection based on extraction of characteristic value of pseudo-range measurement provided by the present disclosure, by constructing the data conversion matrix, performs characteristic extraction to the gathered pseudo-range measurement values, extracts and distinguishes the characteristics of the pseudo-range measurement values of the satellites within the same one constellation, and constructs N–K redundant observed quantities and K new pseudo-range measurement values, to enable the receiver to perform fault detection by using the consistency check of solution separation, and realize the usability of the pseudo-range measurement values during constellation faults.

The method for ARAIM fault detection based on extraction of characteristic value of pseudo-range measurement provided by the present disclosure performs time sampling to the pseudo-range measurement values preliminarily collected by the receiver, to obtain the effective sample data among them, which reduces the locating resolving, and improves the real-time capability of the fault detection of the airborne receiver. When facing constellation faults, the method extracts the main characteristic components of the pseudo-range measurement values, and simultaneously obtains the redundant values, to enable the autonomous fault detection of the receiver to be normally used during constellation faults, which ensures the usability of the algorithm of solution separation of fault detection.

By referring to the explanation and implementation of the present disclosure disclosed herein, the other embodiments of the present disclosure can be easily envisaged and understood by a person skilled in the art. The description and the embodiments are merely considered as exemplary, and the true scope and spirit of the present disclosure are defined by the claims.

What is claimed is:

1. A method for ARAIM fault detection based on extraction of characteristic value of pseudo-range measurement, wherein the method comprises the following steps:

calculating a sum of integrity risks of each of fault modes and a maximum value of the integrity risks, calculating a quantity of the fault modes by using a ratio of a total integrity risk to an integrity risk of a largest fault, and using a sample quantity of corresponding pseudo-range measurement values as an effective sample quantity;

using a ratio of a time duration T to the effective sample quantity as an effective sampling duration;

sampling samples of pseudo-range measurement values that are gathered by a receiver within the effective sampling duration, to obtain an effective pseudo-range measurement set; and by using the effective pseudo-range measurement set, calculating a test statistic, and performing integrity fault detection.

2. The method according to claim 1, wherein the sum of integrity risks of each of fault modes is calculated by using the following method:

$$P_\Sigma = \sum_{k=0}^{N} P\{|x_q^{(0)} - x_q| > PL \cap |x_k^{(k)} - x_q^{(0)}| < L\},$$

wherein L is a threshold, $x_q$ represents a true position of a user, $x_q^{(0)}$ represents a solution of all visible satellites, $x_k^{(k)}$ is a solution of subset locating in a fault mode k, PL is a protection class, and P is a probability of occurrence of a fault mode.

3. The method according to claim 1, wherein the maximum value of the integrity risks is calculated by using the following method, $$P_{MAX} = MAX\{P[|x_q^{(0)} - x_q| > PL \cap |x_k^{(k)} - x_q^{(0)}| < L]\},$$

wherein L is a threshold, $x_q$ represents a true position of a user, $x_q^{(0)}$ represents a solution of all visible satellites, $x_k^{(k)}$ is a solution of subset locating in a fault mode k, PL is a protection class, and P is a probability of occurrence of a worst fault.

4. The method according to claim 1, wherein the effective sample quantity is calculated by using the following method:

$$N^* = \frac{P_\Sigma}{P_{max}},$$

wherein $P_\Sigma$ is the sum of integrity risks of each of fault modes, and $P_{MAX}$ is the maximum value of the integrity risks.

5. The method according to claim 1, wherein the effective sampling duration is calculated by using the following method:

$$\Delta T_e = \frac{T}{N^*},$$

wherein T is the time duration, and N* is the effective sample quantity.

* * * * *